United States Patent [19]

Dehais

[11] 4,138,240
[45] Feb. 6, 1979

[54] MACHINE FOR MANUFACTURING AMPULLAE, PARTICULARLY PHARMACEUTICAL AMPULLAE

[75] Inventor: Claude Dehais, Paris, France
[73] Assignee: Sotapharm, LaFerte-Bernard, France
[21] Appl. No.: 792,789
[22] Filed: May 2, 1977
[30] Foreign Application Priority Data May 3, 1976 [FR] France ................................ 76 13185

[51] Int. Cl.² .................................................. C03B 23/10
[52] U.S. Cl. ........................................ 65/280; 65/292; 65/298; 221/266
[58] Field of Search .......... 65/280, 276, 292, 295–299, 65/108–110; 221/266, 273, 274, 276, 301

[56] References Cited

U.S. PATENT DOCUMENTS 2,002,432  5/1935  Comoy ................................ 65/280 X
2,380,194  7/1945  Sharp ................................ 221/301 X

FOREIGN PATENT DOCUMENTS 417786  8/1925  Fed. Rep. of Germany ............. 65/292
1112813  8/1961  Fed. Rep. of Germany ............. 65/280

Primary Examiner—Robert L. Lindsay, Jr.

[57] ABSTRACT

A machine for the manufacture of ampullae, particularly pharmaceutical ampullae, of the type according to which the ampullae are formed from sticks of glass.

The machine has an automatic control device for sequentially introducing, at a determined position in said path, the lower end of each of the sticks of the bundle into a stick guide and supply scoop between the two corresponding mandrels.

Principal applications: manufacture of pharmaceutical ampullae.

6 Claims, 3 Drawing Figures

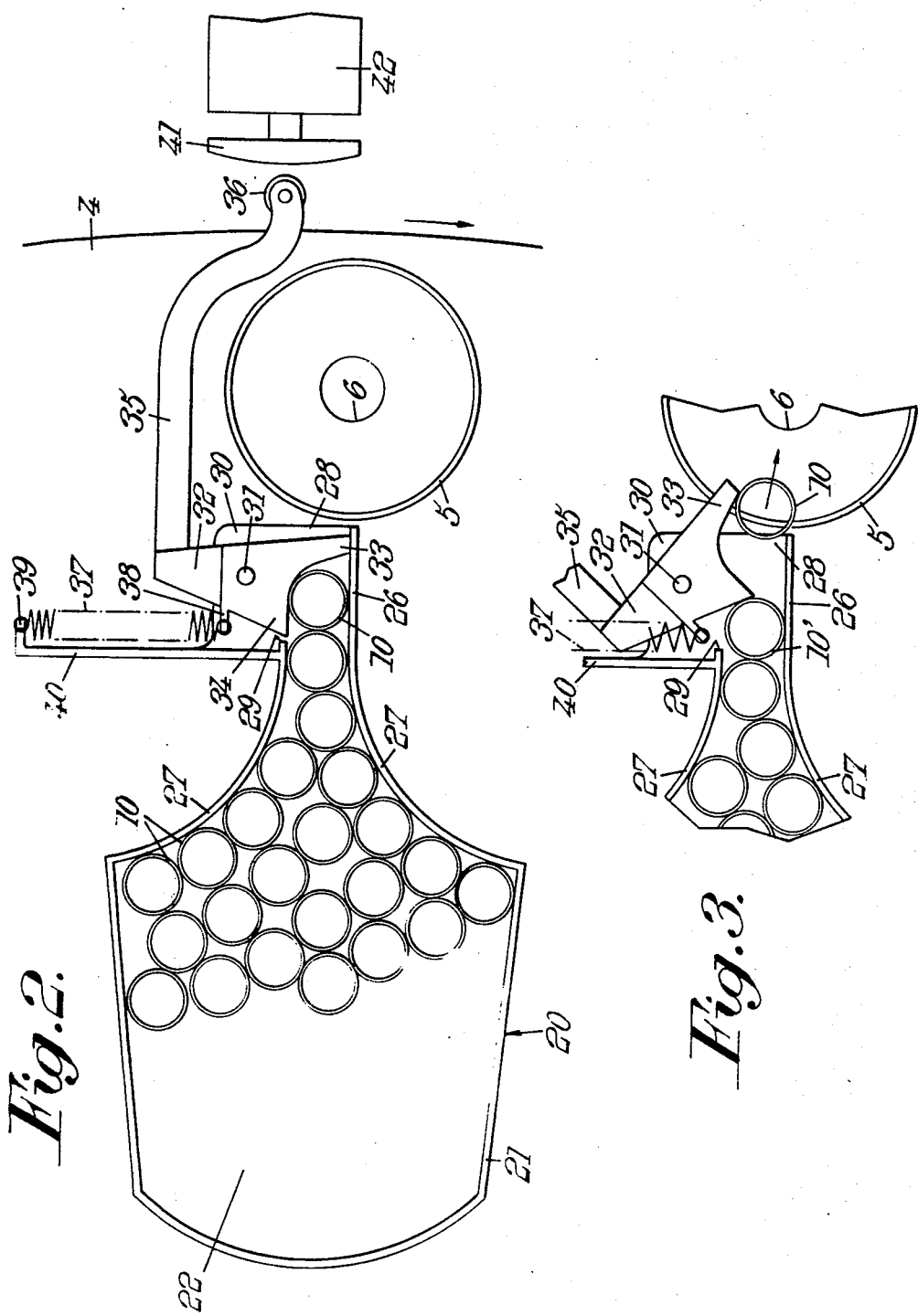

MACHINE FOR MANUFACTURING AMPULLAE, PARTICULARLY PHARMACEUTICAL AMPULLAE

The present invention relates to a machine for the manufacture of ampullae, particularly pharmaceutical ampullae, of the type according to which the ampullae are formed from glass sticks which move along a determined path while rotating about their own axes, the machine comprising for this purpose a number of heating stations spread out along said path and in front of each of which passes successively a determined portion of each of the sticks, maintained in the desired axial position by two clamping mandrels pivoting about their axis and adapted particularly, when they arrive at a determined position in said path, to move away from each other so as to cause the drawing out of said stick portion and, when they arrive at the end of the path, to be released to allow the stick concerned to move downwards a distance corresponding to the desired length of the ampullae, and in which, furthermore, each pair of associated mandrels can be supplied with successive sticks from a bundle of sticks.

Machines of this type are already known, in which, so as to allow pairs of mandrels to be supplied with successive sticks, there is provided for each pair of mandrels a drum, each recess of which contains a stick and whose rotation, which takes place by steps each time a stick is used up and must be replaced, brings a new stick between said two mandrels.

The disadvantage of this kind of stick supplying device resides in the fact that the loading of the drums with new sticks, at start up of the machine and each time that the preceding load of the drum is exhausted, is long and tiresome.

In other types of machines at present in use, there is provided, above each pair of mandrels, a funnel-shaped scoop, rotated about its axis at the same time as the associated mandrels, and in which, when a stick is used up, is introduced the lower end of a new stick taken from a bundle, the scoop then guiding this stick into the axis of the two mandrels. Here again, it is a tiresome operation, all the more as the scoops not only rotate about their axis but rotate also about the axis of the machine, following said determined path of the sticks. This operation is then tiring and demands a certain amount of skill; furthermore the operator in charge of checking the ampullae manufactured and of their packing must leave his post, at determined intervals, to go and load up all the scoops of the machine.

The object of the present invention is to remove these disadvantages and especially to avoid this manual operation of loading the scoops.

To achieve this, a machine in accordance with the invention, of the type mentioned at the beginning, is characterized in that it comprises an automatic control device for sequentially introducing, at a determined position in said path, the lower end of each of the sticks of the bundle into a scoop supplying and guiding the stick between the two corresponding mandrels.

Advantageously, such a machine can be further characterized in that it comprises, for supporting the sticks of each of the bundles by their lower end, a supporting plate tilted towards the corresponding scoop and having a guide spout whose outlet is located at a level substantially higher than that of the upper edge of said scoop.

In addition, said automatic control device comprises, at the outlet of said spout, closing means adapted to be controlled at said determined position in the path of the sticks.

In a particularly advantageous embodiment, a machine according to the invention can further be characterized in that said closing means are formed so that, when they are actuated, they allow the lower end of a stick to enter said scoop whilst simultaneously preventing the following stick from having access thereto.

To this end, said closing means are preferably formed by a member adapted to pivot about an axis substantially parallel to the axis of the sticks of the bundle and having, on the one hand, a concave nose-piece closing the outlet of said spout when said member is in a rest position and adapted to serve then as a stop for the lower end of the next stick to be supplied to the two mandrels and, on the other hand, a heel which leaves the passage of said spout free in said rest position, the arrangement being such that, when said member pivots, said nose-piece lets the next stick pass towards the scoop, whereas the heel which at that time is closing the spout, prevents the following stick from passing farther.

In a particularly simple and reliable embodiment, a machine in accordance with the invention can be further characterized in that the pivoting closing member is integral with a push-rod and is urged towards its rest position by the action of a return spring and in that it comprises at said determined position in the path of the sticks, a movable stop adapted, when it is commanded, to cause successive pivoting of the closing members, by acting successively on the corresponding push-rods.

Preferably, said movable stop is actuatable by means of an electro-magnet.

The machine can be advantageously associated with a programmer adapted, among other functions, to cause, at the desired moment, the coil of said electro-magnet to be supplied with current.

Said other functions can consist in controlling for example different accessories of the machine, particularly a pre-heating burner and an "economiser" which, at the beginning of the treatment of each new stick, reduces the length of the first off-cut, and in counting the ampullae, selecting their sizing, etc. This programmer may be of any appropriate type.

One embodiment of the invention is described below as a non-limiting example, with reference to the figures of the accompanying drawing in which:

FIG. 2 is a top view of an automatic control device of the invention, the closing member being at the rest position; and FIG. 3 is a view corresponding to FIG. 2 after said closing member has pivoted.

Figure 1:
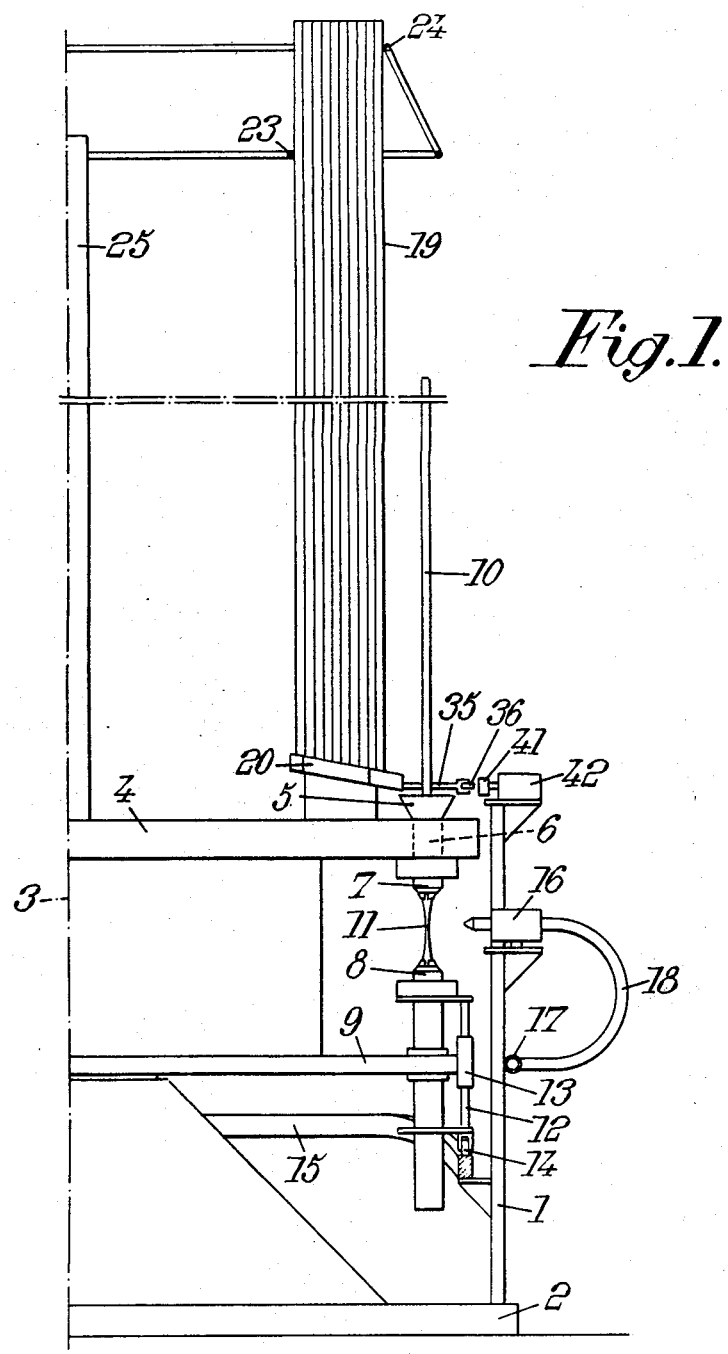
FIG. 1 shows schematically and partially, in elevation, following a radial direction, a machine equipped in accordance with the invention, particularly such as it appears at one of said determined positions in the path of the sticks.

The machine shown in FIG. 1 comprises essentially a fixed frame 1 integral with a base 2 in relation to which a rotatable plate 4 can pivot about a vertical axis 3. This plate carries, evenly spaced out along its periphery, funnel-shaped scoops 5 whose central opening 6 (see FIG. 2) is in the axis of one of a number of pairs of clamping mandrels also evenly spread out along the periphery of plate 4, such as the pair of clamping mandrels 7 and 8. The upper mandrel 7 is mounted under the rotatable plate 4 and the lower mandrel 8, which is located opposite thereto, is mounted on a bracket 9 locked with said plate to rotate therewith; these two mandrels rotate then about axis 3. The two mandrels 7 and 8 are adapted to let a stick of glass, such as stick 10, slide downwards for a determined distance corresponding to the length of an ampulla, then to clamp it cyclically at each rotation of plate 4, at determined positions in its path, so that stick portion 11, extending between the two mandrels, can be heated, by means of a series of heating stations evenly spread out around plate 4, then, at another determined position in the path, e.g. the one shown in FIG. 1, be drawn out to form the upper tip of the last ampulla manufactured at the lower tip of the next ampulla. For this purpose, the lower mandrel 8 of each pair of mandrels 7 and 8 is integral with a control rod 12 slidable in a sleeve 13 integral with bracket 9 and whose lower end is provided with a roller or similar 14 biased by resilient means on to a track 15 extending about axis 3 and whose path, at the position of the drawing out station, is curved downwards so as to separate by an extra distance lower mandrel 8 from upper mandrel 7 which is opposite thereto.

The different heating stations are formed by burners such as burner 16, and are supplied, for example, by a mixture of air, oxygen and propane from a peripheral pipe 17 through a flexible pipe 18. This arrangement allows the different burners 16 to pivot about a vertical shaft integral with the frame, so as to "accompany" each of sticks 10 along each of the segments of its peripheral path, between two successive heating stations. So that the heating of each of stick sections 11 be uniform, it is furthermore provided that scoop 5 and clamping mandrels 7 and 8 rotate about their own axis. Of course, for simplicity's sake, the different accessory members of the machine which have no direct relation with the invention, e.g. the drive means for rotating plate 4, burners 16 and scoops 5 have not been shown.

The invention relates in fact more exactly, as has been stated above, to the means for automatically feeding each of scoops 5 with a new stick 10 taken from a corresponding bundle of sticks 19, this being achieved cyclically at a determined position in the path of the sticks each time that a stick 10 has been completely used up.

To this end, each of the bundles of new sticks 19 is supported by a supporting plate 20 provided with flanges 21 and whose bottom 22 (FIG. 2) is tilted radially towards the corresponding scoop 5. Each of the bundles 19 is, moreover, held vertically in position by peripheral hoops or similar 23 and 24 secured to a central pivotable support 25.

Each of supporting plates 20 comprises a guide spout 26 whose inlet is bell-mouthed (at 27) and whose outlet 28 comes out adjacent the periphery of the corresponding scoop 5 and at a level slightly above the upper edge of this scoop.

Such being the case, the automatic control device for sequentially introducing, at said determined position in the path of the sticks, the lower end of a stick from bundle 19 into the stick guide and supply scoop 5 between the two corresponding mandrels 7 and 8 is formed in the following way: in front of a part 29, adjacent outlet 28 of spout 26, cut out in flange 21 of supporting plate 20, the bottom of the spout is laterally extended by a support plate 30 on which is mounted a closing member 32 pivotable about an axis 31. This closing member has, on the one hand, a concave nose-piece 33 whose curvature corresponds at least approximately to that of the different sticks 10 of bundle 19 and which closes the outlet of spout 26 when member 32 is in the rest position. In this position, a heel 34 of said member 32 lets the next stick 10 pass towards nose-piece 33 for supplying scoop 5.

Closing member 32 is moreover integral with a push-rod 35 whose free end carries a roller 36; a return spring 37 is, in addition, stretched between a peg 38 of closing member 32 and end 39 of a hook 40 integral with supporting plate 20.

At said determined position in the path of the sticks, i.e. in the position at which, at the desired moment, scoops 5 must be supplied one after the other with a new stick, there is provided, secured to frame 1 of the machine, a radially movable stop 41 which is able to move into the peripheral path of the successive rollers 36 when it is operated. For this purpose, this movable stop 41 is integral with the movable element of an electro-magnet 42 adapted to be controlled at the appropriate determined moment by a programmer (not shown) i.e. when all the sticks have been used up. This programmer can be of any appropriate type and can be used moreover for controlling automatically other members of the machine, e.g. a special pre-heating burner, an economiser, etc. and to count the number of ampullae manufactured and to ensure the selection of their sizing.

Thus, when the programmer sends a control signal to electro-magnet 42, the movable stop 41 moves radially towards the center of the machine and, each time that a roller 36 comes into contact therewith, causes push-rod 35 and closing member 32 to pivot (anti-clockwise) about axis 31. Consequently, stick 10 initially bearing by its lower end on nose-piece 33 of member 32, can slide into the central opening 6 of the corresponding scoop 5, then be directed, still rotating of course about axis 3 of the machine, between the two associated mandrels 7 and 8 (FIG. 3).

It can be seen that at this moment heel 34 of closing member 32 projects into the outlet spout 26 and prevents the following stick 10' from passing towards the scoop. When roller 36 has left stop 41, push-rod 35 and closing member 31 return to their rest position (rotating this time clockwise) urged by return spring 37, which allows the following stick 10' to bear by its lower end on concave nose-piece 33, from which it will be in its turn directed towards scoop 5 in the next cycle and in the way that has just been described.

It is clear then that a machine according to the invention provides completely automatic feeding of the successive sticks of each of the bundles 19 into scoops 5, which saves the operator in charge of the machine under consideration, and who is normally busy with checking the manufactured ampullae and with their packing, from having to move to manually load said scoops.

I claim:

1. A machine for the manufacture of glass ampoules having a generally cylindrical intermediate body and tapered frangible ends comprising:
   a stationary frame;
   a table mounted on said frame for rotation about a vertical axis;
   a plurality of work stations carried by said table in peripherally spaced relation, each said work station including a scoop member, a pair of mandrels spaced vertically from each other and in vertical alignment with said scoop member, the lower one of said mandrels being slidable relative to the upper one of said mandrels, means for effecting the vertical displacement of said lower mandrel relative to said upper mandrel according to a predetermined cyclical pattern, and means for opening and closing said mandrels at predetermined times;

a plurality of heat emitting stations mounted on said frame in uniformly spaced relation about said table at a level between said upper and lower mandrels;

means for storing a plurality of hollow glass tubes on said table in substantially vertical position in proximity to each of said work stations and for feeding individual ones of said glass tubes to the associated work station on the table by introduction of the lower end of such glass tube into the scoop of such work station wherein each said storing and feeding means includes a support plate tilted downwardly towards the corresponding scoop for supporting said plurality of glass tubes, said plate having a guide spout with an outlet located at a level higher than that of the upper edge of said scoop.

2. A machine according to claim 1, including pivotable closing means for each said plates formed so that, when the closing means are actuated, they allow the lower end of one of said glass tubes to enter the associated scoop while simultaneously preventing discharge of the following glass tube from the support plate.

3. A machine according to claim 2, wherein each said closing means is formed by a member pivotable about an axis substantially parallel to the axes of the glass tubes and having a concave nose-piece closing the outlet of said spout when said member is in a rest position and serving also as a stop for the lower end of the next glass tube to be supplied to the mandrels, each said member having a heel which leaves the passage of said spout free in said rest position, the arrangement being such that, when said member pivots, said nose-piece allows the next glass tube to pass towards the scoop, whereas the heel, which at that time is closing the spout, prevents the following glass tube from discharging from the plate.

4. A machine according to claim 3, including a push rod integral with said closing member, a return spring operatively connected to said closing member normally biasing same towards its rest position, and a movable stop carried by said frame engageable with successive ones of said push rods to cause sequential pivoting of the closing members.

5. A machine according to claim 4, including an electro-magnet for selectively actuating said movable stop.

6. A machine according to claim 5, including a programmer for supplying the said electro-magnet with current.

* * * * *